Nov. 20, 1928.
A. SMITH
CLUTCH CONTROL
Filed April 19, 1926    2 Sheets-Sheet 1
1,692,390
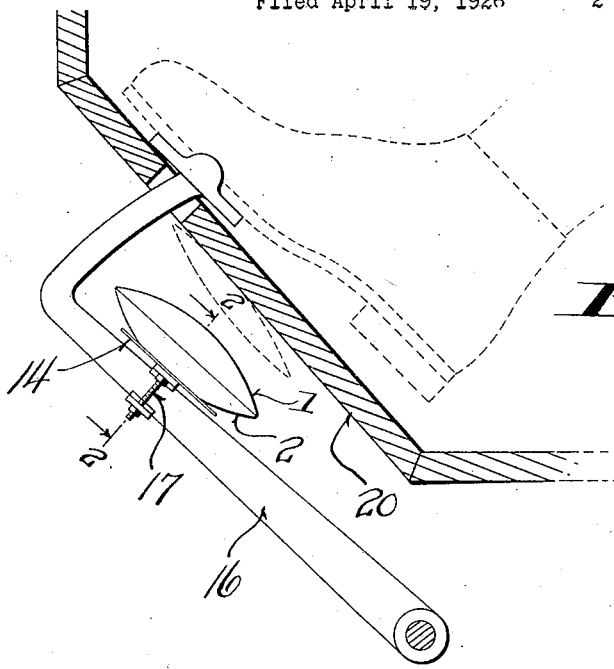
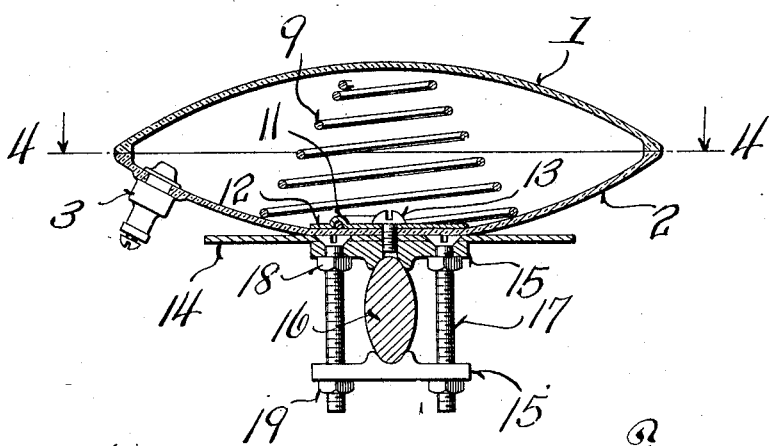
Inventor:
Andrew Smith Nov. 20, 1928. 1,692,390
A. SMITH
CLUTCH CONTROL
Filed April 19, 1926 2 Sheets-Sheet 2
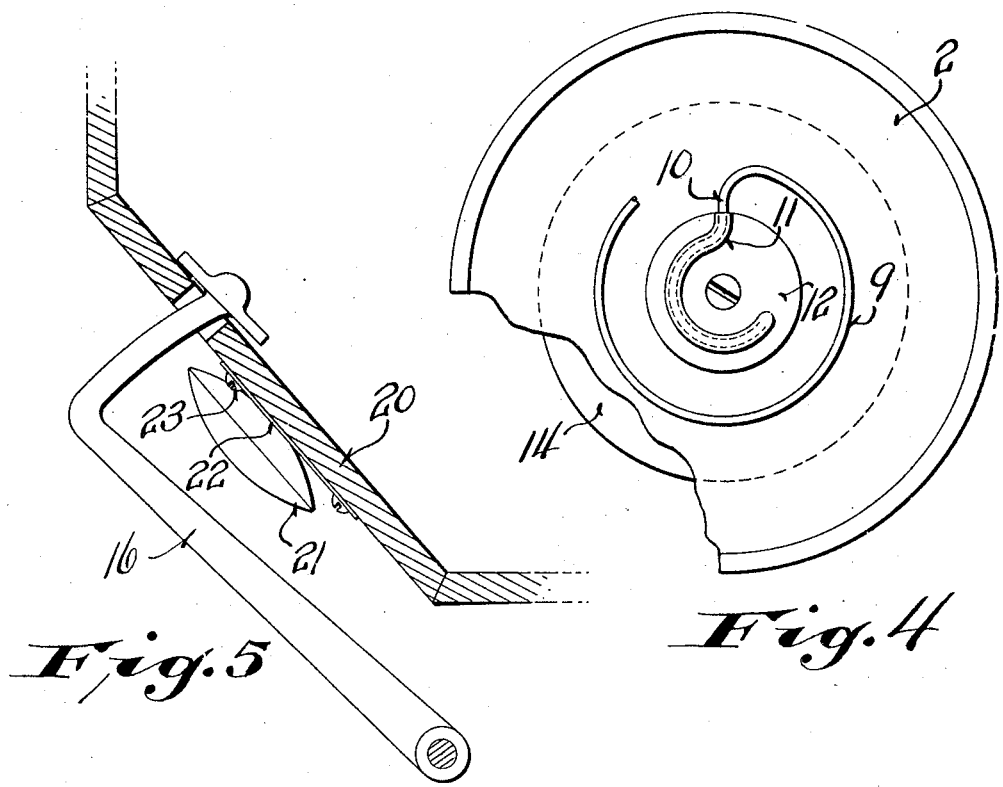
Fig.5　　Fig.4
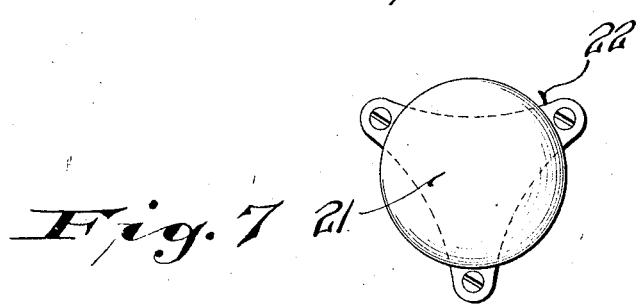
Fig.6
Fig.7
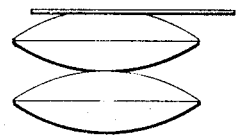
Inventor
Andrew Smith
By
Attorneys Patented Nov. 20, 1928.

1,692,390

UNITED STATES PATENT OFFICE.

ANDREW SMITH, OF MILWAUKEE, WISCONSIN, ASSIGNOR TO SMITH LABORATORIES, INC., OF MILWAUKEE, WISCONSIN, A CORPORATION OF WISCONSIN.

CLUTCH CONTROL.

Application filed April 19, 1926. Serial No. 102,969.

This invention relates to a clutch control device.

Objects of this invention are to provide a device for controlling the clutch closing motion of the clutch pedal of an automobile so that such pedal will be restrained from quickly snapping into clutch closing position, but instead, will be permitted to move slowly into clutch closing position.

Further objects are to provide a device, which although restraining the closing motion of the clutch pedal, will nevertheless, permit quick opening motion to be imparted to such pedal.

Further objects are to provide a device which does not need adjustment of levers, links or plungers, but which may be quickly attached to the automobile in a simple and secure manner with the assurance that it will be correctly positioned and will not require adjustment.

Further objects are to provide a clutch control device which is of extreme simplicity, which may be cheaply manufactured, and which is not likely to get out of order.

Embodiments of the invention are shown in the accompanying drawings, in which:

Figure 1 is a fragmentary sectional view through a portion of an automobile showing a clutch pedal with the device in place.

Figure 2 is an enlarged sectional view on the line 2—2 of Figure 1.

Figure 3 is an enlarged sectional view through the valve.

Figure 4 is an enlarged view of the lower portion of the device, such view corresponding to a section on the line 4—4 of Figure 2.

Figure 5 is a view corresponding to Figure 1 showing a modified form of the invention.

Figure 6 shows the device of Figure 5 removed from the automobile.

Figure 7 is a view of a modified form.

Referring to Figures 1 to 4, it will be seen that the device comprises a cushion like member of discus shape. This member is made of an upper and a lower flexible member indicated by the reference characters 1 and 2 whose peripheral edges are joined or cemented together in an air tight manner. These members may be made of any suitable material, such as rubber, for instance, and are freely flexible. The interior of the cushion like member is placed in communication with the external air by means of the fitting or the valve 3. This valve is provided with a valve seat and with a ball 4 located in proximity to such seat. It is also provided with transverse entrance apertures 5 for the air. The body of the valve 3 is provided with an internally threaded aperture through which a screw 6 projects, such screw being locked in place by means of the locking nut 7. It is to be noted from Figure 3 that the valve ball 4 is held slightly off its seat by means of the reduced extension 8 of the screw 6, the distance the valve is held off its seat being controlled by the adjustment of the screw. Thus, the valve permits free and unrestrained entrance of air into the cushion like member, and allows the air to escape slowly therefrom, so that the member may quickly expand, but may not be as quickly flattened.

In order to provide for the expansion of the cushion like member, a conical spring 9 is positioned within such member as shown in Figure 2.

Its lower end is inturned as indicated at 10 in Figure 4, and is curved. This inturned and curved end is received in an upwardly struck channel or groove 11 formed in an inner clamping plate 12. The clamping plate 12 is apertured and receives the clamping screw 13 which passes through the outer clamping and attaching plate 14, such latter plate being materially larger than the inner plate 12 so as to provide an extended surface against which the cushion member may bear while it is being flattened.

The plate 14 is secured to clamps 15 by means of countersunk screws, and such clamps 15 are provided with recessed inwardly directed lugs for engagement with opposite sides of the clutch lever 16 as most clearly shown in Figure 2. The screws 17 are preferably locked to the uppermost plate 15 by means of the locking nuts 18, and the lower plate 15 is drawn upwardly into clamping engagement with the under side of the clutch lever 16 by means of the nuts 19.

In using the device, it is merely necessary to remove the lower plate 15 and position the screws 17 on opposite sides of the clutch lever. Thereafter, the lower plate may be repositioned and clamped against the clutch lever as shown in Figure 1. The clutch lever may be freely depressed to clutch open position as shown in full lines in Figure 1. However, when it is allowed to move backwardly, the cushion member contacts with the bottom of the floor board 20, and causes a gradual closing motion for the clutch lever. This prevents the clutch from grabbing and jarring the car and mechanism. Instead, the clutch is permitted to close in a gradual and uniform manner without sudden engagement.

The same form of cushion member is indicated at 21 in Figures 5 and 6 as that previously described, and is similarly equipped with an internal spring and clamping plates. However, the outer clamping plate may be of spider like formation and is indicated by the reference character 22. This outer plate 22 is secured to the under side of the floor board 20 by means of screws 23 as shown in Figure 5. In this position, the cushion member will be struck by the returning clutch lever 16, and such clutch lever will be held against clutch closing motion in the manner previously described.

It is to be particularly noted that the positioning of the device does not require adjustment of other unusual operations, but that it may be attached to the automobile in an extremely simple and easy manner.

Further by having the device free of plungers, links or other mechanism of this type, no adjustment is required.

It will be seen that a clutch control device has been provided which is of extreme simplicity, which may be cheaply manufactured, and which is certain in its operation.

As shown in Figure 7, a plurality of the cushioning members may be used where the length of stroke requires it. The members shown in Figure 7 may be attached to each other in any suitable manner. For example, the plates 12, shown in Figure 4, of succeeding members can be readily secured together by means of the screws or bolts illustrated in Figure 4.

Although the invention has been described in considerable detail, such description is intended as illustrative rather than limiting as the invention may be variously embodied and as the scope of such invention is to be determined as claimed.

I claim:

1. A device for controlling the operation of the clutch pedal of an automobile comprising a pair of flexible members joined at their margins and forming a hollow cushion, a valve device communicating with the interior of said cushion and permitting a quick entrance of air and a gradual discharge of air, a pair of plates clamping one of said members between them with one of said plates located within the interior of said cushion, and a spring carried by said interiorly located plate and adapted to expand the cushion.

2. A clutch pedal control comprising a discus shaped hollow flexible member, a valve permitting quick entrance of air into said member and restraining the outward flow of air therefrom, a pair of clamping members engaging a wall of said first mentioned member, and means located within said first mentioned member tending to expand such member.

3. A clutch pedal control device comprising a hollow cushion member formed of flexible material, a pair of clamping plates engaging a wall of such cushion member between them, one of said plates being located within said cushion member, a conical spring having one end inturned and curved and located adjacent the inner plate, said inner plate having a correspondingly shaped recess formed therein for the clamping reception of the curved and inturned portion of said spring, said spring being adapted to expand the cushion member, a ball valve permitting free entrance of air to such member and having a stationary pin for holding the valve slightly out of seating position to permit a restricted flow of air from said cushion member.

4. A clutch pedal control comprising a plurality of discus shaped hollow flexible members arranged with their axes in line, valves permitting quick entrance of air into said members and restraining the outward flow of air from such members, and means for securing the members in place between the floor board and clutch pedal of an automobile.

5. The combination of an automobile having a control pedal and a fluid cushioning device carried by said pedal, said device having relatively movable portions one of which is adapted to contact with a stationary portion of the automobile and one of which is attached to the said pedal, said device having means controlling the escape of fluid, whereby the motion of said pedal in one direction is automatically cushioned.

6. The combination of an automobile having a control pedal and a fluid cushioning device carried by said pedal, said device having relatively movable portions one of which is adapted to contact with a stationary portion of the automobile and one of which is attached to said pedal, said device having adjustable means for controlling the escape of fluid, whereby the motion of said pedal in one direction is automatically cushioned and the speed of such motion may be adjusted.

In testimony that I claim the foregoing I have hereunto set my hand at Milwaukee, in the county of Milwaukee and State of Wisconsin.

ANDREW SMITH.